(12) United States Patent
Kebukawa et al.

(10) Patent No.: US 11,742,716 B2
(45) Date of Patent: *Aug. 29, 2023

(54) MOTOR

(71) Applicant: MINEBEA MITSUMI Inc., Nagano (JP)

(72) Inventors: Koji Kebukawa, Nagano (JP); Katsutoshi Suzuki, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,795

(22) Filed: Dec. 19, 2022

(65) Prior Publication Data

US 2023/0129432 A1 Apr. 27, 2023

Related U.S. Application Data

(63) Continuation of application No. 16/667,000, filed on Oct. 29, 2019, now Pat. No. 11,563,353.

(30) Foreign Application Priority Data

Oct. 30, 2018 (JP) .................................. 2018-203855

(51) Int. Cl.
    *H02K 5/16* (2006.01)
    *H02K 5/173* (2006.01)
    (Continued)

(52) U.S. Cl.
    CPC ........... *H02K 5/1735* (2013.01); *F16C 19/54* (2013.01); *H02K 7/085* (2013.01); *H02K 21/22* (2013.01);
    (Continued)

(58) Field of Classification Search
    CPC ...... H02K 5/1735; H02K 7/085; H02K 21/22; F16C 19/54; F16C 2380/26; B64C 39/024; B64U 50/19
    (Continued)

(56) References Cited

U.S. PATENT DOCUMENTS 6,614,139 B2   9/2003   Saichi et al.
8,716,912 B2   5/2014   Bailey et al.
(Continued)

FOREIGN PATENT DOCUMENTS

EP    1 849 739 A1    10/2007
JP    52-170205 U     5/1976
(Continued)

OTHER PUBLICATIONS

Notice of Reasons for Refusal dated Mar. 1, 2021 for corresponding Japanese Application No. 2018-203855 and English translation.
(Continued)

*Primary Examiner* — Terrance L Kenerly
(74) *Attorney, Agent, or Firm* — Pearne & Gordon LLP

(57) ABSTRACT

The motor includes a shaft, a cartridge including a plurality of bearings that support the shaft, and a sleeve that surrounds the bearings, and a housing including a bottom portion for receiving an impact from outside and an attaching portion provided in the bottom portion. The bottom portion of the housing extends in a direction intersecting with respect to a longitudinal direction of the shaft, and the cartridge is removably attached to the attaching portion.

5 Claims, 7 Drawing Sheets

(51) Int. Cl.
- *H02K 7/08* (2006.01)
- *H02K 21/22* (2006.01)
- *F16C 19/54* (2006.01)
- *B64C 39/02* (2023.01)
- *B64U 50/19* (2023.01)

(52) U.S. Cl.
CPC ............ *B64C 39/024* (2013.01); *B64U 50/19* (2023.01); *F16C 2380/26* (2013.01)

(58) Field of Classification Search
USPC .......................................................... 310/90
See application file for complete search history.

(56) References Cited

U.S. PATENT DOCUMENTS

| | | | |
|---|---|---|---|
| 10,554,089 B2* | 2/2020 | Liu | H02K 11/215 |
| 10,651,704 B2* | 5/2020 | Sakuragi | H02K 5/22 |
| 2002/0060828 A1 | 5/2002 | Ishizuka et al. | |
| 2006/0267435 A1 | 11/2006 | Lin et al. | |
| 2007/0273238 A1* | 11/2007 | Nomura | H02K 1/187 |
| | | | 310/90 |
| 2015/0176588 A1 | 6/2015 | Yin et al. | |
| 2015/0333592 A1 | 11/2015 | Yin et al. | |
| 2017/0070125 A1* | 3/2017 | Bei | H02K 9/06 |
| 2018/0205295 A1 | 7/2018 | Nishidate | |
| 2018/0233989 A1 | 8/2018 | Ishida | |
| 2019/0128280 A1 | 5/2019 | Horii et al. | |
| 2019/0181701 A1* | 6/2019 | Park | H02K 1/146 |
| 2020/0052556 A1* | 2/2020 | Luo | H02K 7/14 |
| 2020/0136461 A1* | 4/2020 | Kebukawa | H02K 5/1735 |

FOREIGN PATENT DOCUMENTS

| | | |
|---|---|---|
| JP | 07-208457 A | 8/1995 |
| JP | 2002-130285 A | 5/2002 |
| JP | 3091827 U | 2/2003 |
| JP | 2006-219274 A | 8/2006 |
| JP | 2006-333696 A | 12/2006 |
| JP | 2009-055768 A | 3/2009 |
| JP | 2010-041854 A | 2/2010 |
| JP | 2013-009510 A | 1/2013 |
| JP | 2018-117429 A | 7/2018 |
| JP | 2018-129999 A | 8/2018 |
| TW | 1231085 B | 3/2005 |
| WO | 2018029741 A1 | 2/2018 |

OTHER PUBLICATIONS

Decision to Grant a Patent dated Sep. 27, 2021 for corresponding Japanese Application No. 2018-203855 and English translation.
Notice of Reasons for Refusal dated Oct. 26, 2022 for corresponding Japanese Application No. 2021-171665 and English translation.
"Density of Metals Table". https://amesweb.info/Materials/Density-of-Metlas.aspx. Accessed Dec. 3, 2021.
https://www.thesaurus.com/browse/at, synonyms for the word at.
Notice of Reasons for Refusal dated Mar. 22, 2023 in the corresponding Japanese Application No. 2021-171665 and English translation.

* cited by examiner

MOTOR

CROSS REFERENCE TO RELATED APPLICATIONS

This application is a continuation application of U.S. application Ser. No. 16/667,000 filed on Oct. 29, 2019 which claims the benefit of Japanese Patent Application No. 2018-203855, filed Oct. 30, 2018, which is hereby incorporated by reference in its entirety.

BACKGROUND

Technical Field

The present disclosure relates to a brushless motor mountable on a floating mobile body such as a drone, for example.

Background

In a drone, an impact to a machine body upon landing may damages a bearing of a motor for driving a blade. Therefore, if the machine body is subjected to a large impact upon landing, the motor needs to be replaced at that time. As a result, in the labor to replace the motor being required and the cost are increased.

SUMMARY

The present disclosure is related to providing a motor capable of suppressing labor and costs even when the motor is used for a floating mobile body such as a drone liable to be subjected to a large impact.

The above-described object is achieved by the present disclosure described below. In other words, according to a first aspect of the present disclosure, a motor includes a shaft, a cartridge including a plurality of bearings supporting the shaft, and a sleeve surrounding the bearings, and a housing including a bottom portion receiving an impact from outside and an attaching portion provided in the bottom portion, wherein the bottom portion of the housing extends in a direction intersecting with respect to a longitudinal direction of the shaft, and the cartridge is removably attached to the attaching portion.

According to a second aspect of the present disclosure, in the motor, the cartridge may be removably attached to the attaching portion together with the shaft.

According to a third aspect of the present disclosure, in the motor, a specific gravity of a member forming the shaft may be smaller than a specific gravity of a member forming the bearing, and the shaft may be formed in a hollow shape.

According to a fourth aspect of the present disclosure, in the motor, one end portion on the bottom portion side of both end portions of the shaft may be positioned on a more inward side of the housing than the bottom portion.

According to a fifth aspect of the present disclosure, in the motor, the attaching portion can include a cylindrical portion accommodating the cartridge. In this case, the cylindrical portion may include one end portion on the bottom portion side and another end portion on an opposite side of the bottom portion in the longitudinal direction of the shaft, the attaching portion includes a fixing member provided at the other end portion of the cylindrical portion, and the cartridge may be fixed and sandwiched between the fixing member and the bottom portion.

According to a sixth aspect of the present disclosure, in the motor, an elastic member may be interposed in at least part of a space between the cartridge and the housing. In this case, the elastic member may be interposed between a part of the cartridge and a part of the housing, the cartridge and the housing facing each other, in the longitudinal direction of the shaft. Alternatively, the elastic member may be interposed between the cartridge and the bottom portion or between the cartridge and the fixing member, in the longitudinal direction of the shaft.

According to a seventh aspect of the present disclosure, the motor may include a rotor removably fixed to the shaft. In this case, the motor can include a stator surrounded by the rotor, wherein the rotor includes a disc portion removably fixed to the shaft.

DETAILED DESCRIPTION

Hereinafter, embodiments of the present disclosure will now be described with reference to the drawings.

Figure 1:
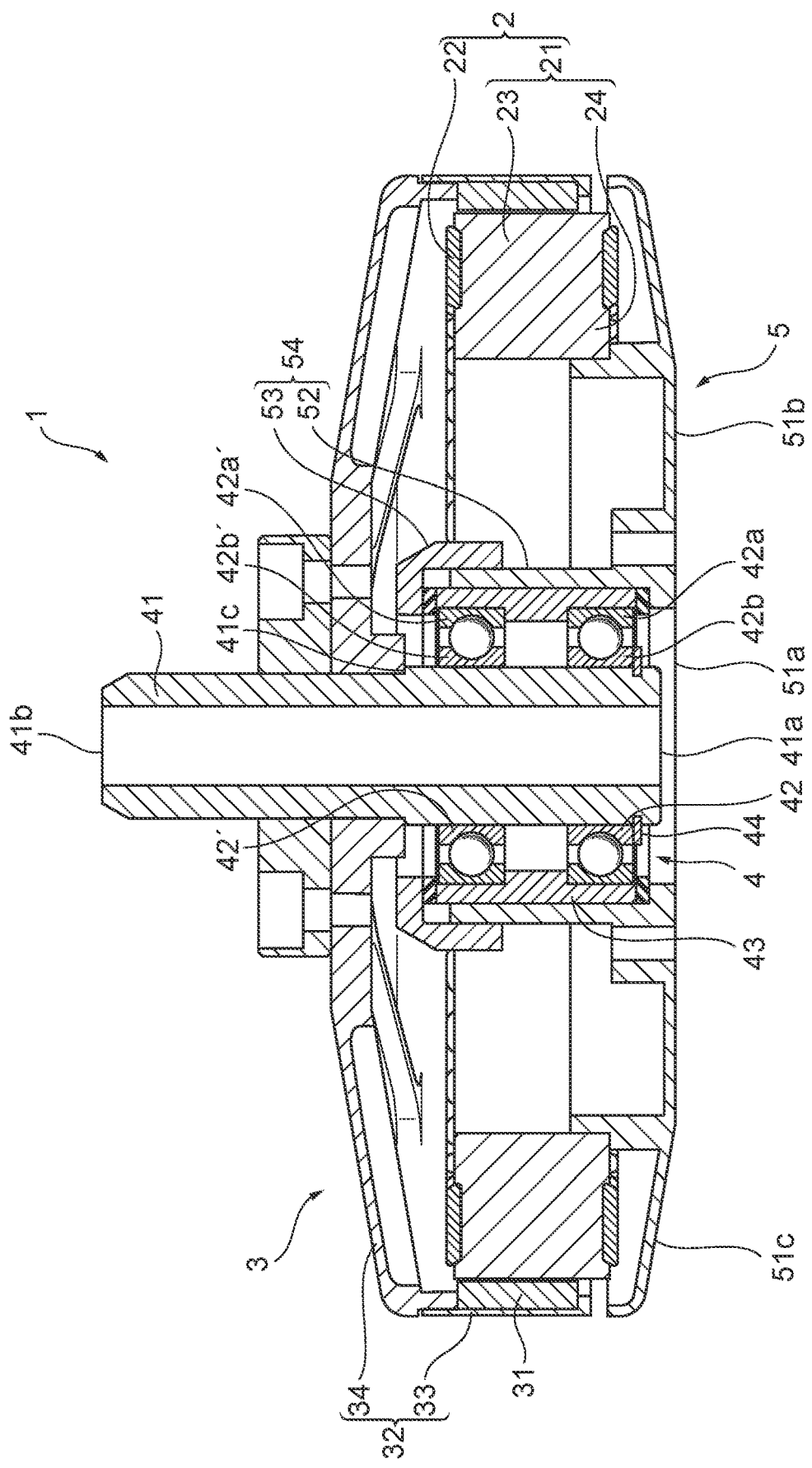
FIG. 1 is a cross-sectional view of a motor of an outer rotor type motor according to an exemplary embodiment of the present disclosure.
Figure 2:
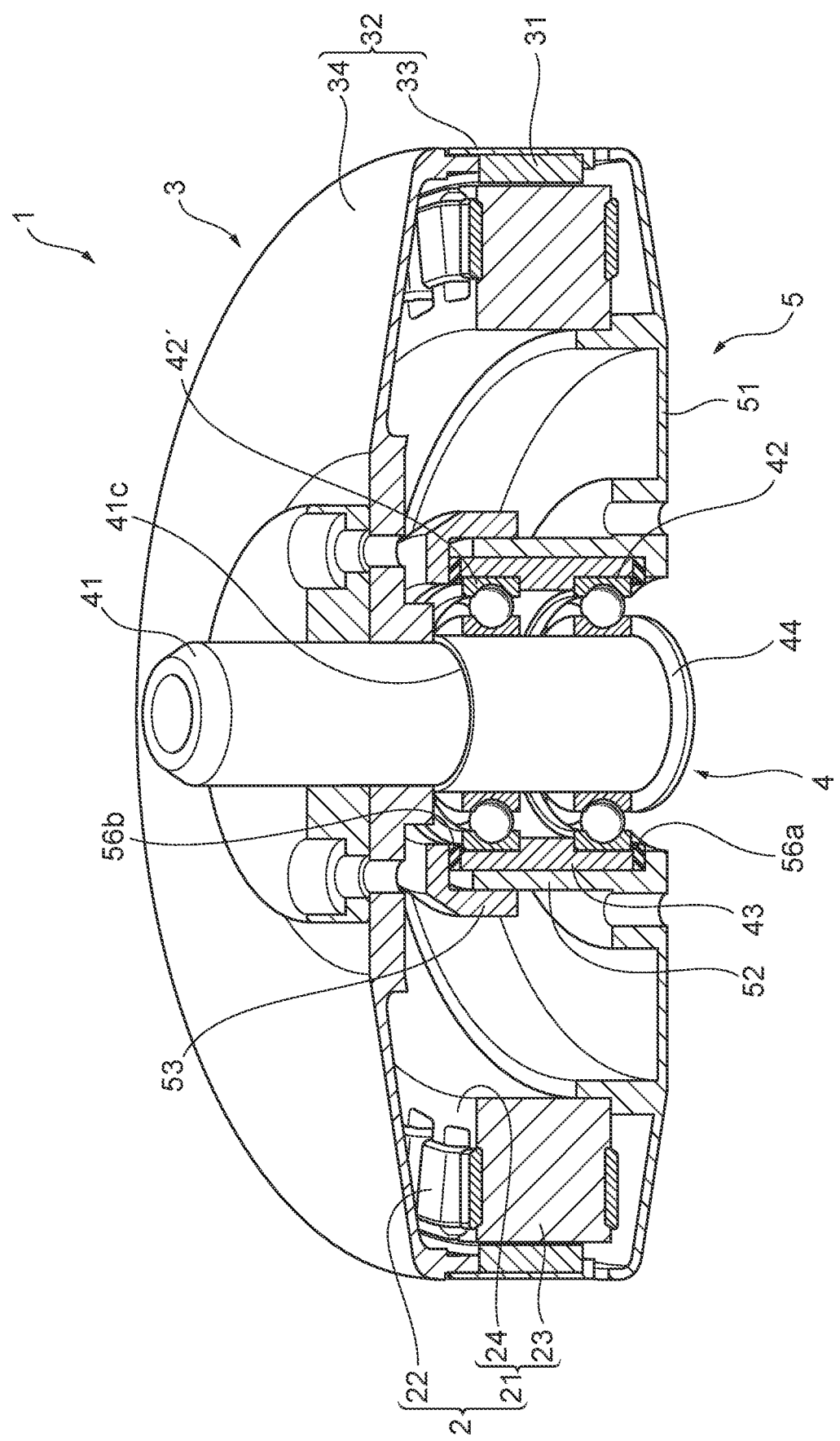
FIG. 2 is a cross-sectional perspective view of a motor according to an exemplary embodiment of the present disclosure.

FIG. 1 is a cross sectional view of a motor 1 according to an exemplary embodiment of the present disclosure. FIG. 2 is a cross sectional perspective view of the same cross section as FIG. 1 viewed from obliquely above. The terms "upward" and "downward" used in the description of the present embodiment mean the up and down relationship shown in FIG. 1 and FIG. 2, and does not necessarily correspond to the up and down relationship in the gravity direction.

The motor 1 includes a stator 2, a rotor 3, a cartridge 4, and a housing 5, thereby forming a brushless motor of an outer rotor type. The stator 2 includes a tooth part 23 extending outward and a coil 22 wound around the tooth part 23. The roter 3 includes a magnet 31 disposed outward of the stator 2 and facing the tooth part 23. A cartridge 4 serving shaft 41 as a rotary shaft is attached to the cartridge. The shaft 41 is fixed at a center of the roter 3. A housing 5 accommodates the stator 2 fixed to the housing 5. The rotor 3 is rotatable with respect to the stator 2.

The stator 2 surrounded by the rotor 3 includes a stator core 21 including the tooth part 23, and the coil 22.

The stator core 21 has a laminated body of silicon steel plate or the like, and includes an annular portion (core) 24 disposed coaxially with the shaft 41, and a plurality of tooth parts (magnetic pole parts) 23 formed to extend radially from the annular portion 24 outward.

The coil 22 is wound around each of the plurality of tooth parts 23. The stator core 21 and the coil 22 are insulated from each other by an insulator (not illustrated) made of an insulating material. The stator core and the coil may be insulated from each other by applying an insulating film at a surface of the stator core instead of using the insulator.

The rotor 3 includes the magnet 31 and a rotor yoke 32. The rotor yoke 32 includes an outer peripheral tubular portion 33, and a disc portion 34 connecting the shaft 41 and the tubular portion 33. The tubular portion 33 is erected vertically (in a downward direction in FIG. 1 and FIG. 2) from an outer edge of the disc portion 34, and is in a cylindrical shape centered about an axis of the shaft 41 to surround the stator 2.

The rotor yoke (iron core) 32 has a function of preventing the magnetic field from leaking out of the interior of the rotor yoke 32, and is formed with a magnetic body. The tubular portion 33 and the disc portion 34 of the rotor yoke 32 are formed by the magnetic body, but may be formed with a nonmagnetic body if there is no problem in terms of characteristics. For example, both of the tubular portion 33 and the disc portion 34 may be integrally formed with aluminum. Alternatively, one of the tubular portion 33 and the disc portion 34 may be formed with a magnetic body and the other may be formed with a nonmagnetic body. The magnet 31 is attached to an inner peripheral surface of the tubular portion 33 in such a manner as to face the stator 2. The magnet 31 is formed in an annular shape, and includes regions magnetized to an N pole and regions magnetized to an S pole alternately at constant intervals in a circumferential direction.

Figure 3:
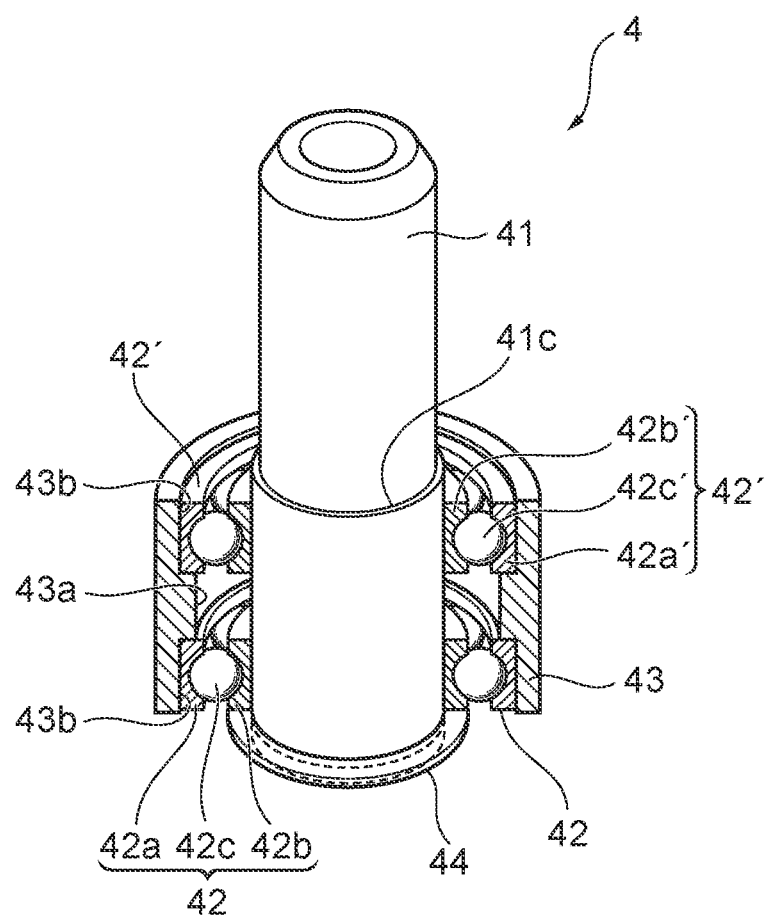
FIG. 3 is a cross-sectional perspective view illustrating only a cartridge removed from FIG. 2.

In the present embodiment, the cartridge 4 includes the shaft 41, two bearings 42 and 42', and a sleeve 43. FIG. 3 is a cross-sectional perspective view illustrating only the cartridge 4 removed from FIG. 2.

The shaft 41 is made of, for example, aluminum, for the purpose of weight reduction. As illustrated in FIG. 1, the shaft 41 is formed in a hollow shape (more specifically, a cylindrical shape).

A stepped portion 41c is provided at a substantially center portion in the axial direction of the shaft 41, and an outer shape (diameter) on the upper side of the stepped portion 41c is smaller than the outer shape (diameter) on the lower side of the stepped portion 41c.

The two bearings 42 and 42' are mounted side by side at certain intervals in the lower part of the shaft 41. When the two bearings 42 and 42' are simply referred to as a "bearing 42" in the following description, contents common to the two bearings 42 and 42' are described unless otherwise noted (the same applies to components of the bearing 42: an outer ring 42a, an inner ring 42b, and a bearing ball 42c).

The bearing 42 is a so-called ball bearing including the outer ring 42a, 42a', the inner ring 42b, 42b', and the bearing ball 42c, 42c'. The bearing ball 42c, 42c' is interposed between the outer ring 42a and the inner ring 42b. The bearing ball 42c rolls between the outer ring 42a and the inner ring 42b, resulting in the rotational resistance of the inner ring 42b to the outer ring 42a is significantly reduced. The bearing 42 is formed of, for example, a hard metallic member such as iron, or a ceramic member in view of the function.

The sleeve 43 is a member having a cylindrical shape, and is made of, for example, plastic or metal. Protrusions and recesses are not formed in an outer peripheral surface of the sleeve 43. However, an inner peripheral surface of the sleeve 43 includes a projecting portion (inner peripheral portion having a small diameter) 43a and recessed portions (inner peripheral portions having a large diameter) 43b. The projecting portion is arranged at a center portion of the inner peripheral surface projects toward a central axis in an axial direction. The recessed portions (inner peripheral portions having a large diameter) 43b arranged at both sides of the projecting portion are recessed in the axial direction. Hereinafter, the projecting portion is referred to as a small inner diameter portion, and the recessed portion is referred to as a large inner diameter portion.

The sleeve 43 may be integrally molded by a known means, to be formed in a shape having the small inner diameter portion 43a and the large inner diameter portions 43b. However, for example, the sleeve 43 may be formed of a plurality of two or more members by inserting a circular pipe having a small diameter into a circular pipe having a large diameter. An inner diameter of the circular pipe having a large diameter is the same as the inner diameter of the small inner diameter portion 43a and an outer diameter of the circular pipe having a small diameter is the same as the inner diameter of the large inner diameter 43b. An inner diameter of the circular pipe having a large diameter is the same as the inner diameter of the large inner diameter portion 43b. As a result, the circular pipe having a small diameter is positioned at a substantially center of the circular pipe having a large diameter in the axial direction.

Furthermore, the circular pipe having a small diameter may be formed of a member different from the member of the circular pipe having a large diameter, and for example, an elastic member such as a helical spring may be used for the member.

The shaft 41 includes one end portion 41a on a bottom portion 51 side of the housing 5 (described later) and another end portion 41b on an opposite side of the one end portion 41a, in a longitudinal direction (axial direction). The two bearings 42 and 42' are positioned side by side in the vicinity of the one end portion 41a of the shaft 41. The shaft 41 is fitted and fixed to the inner ring 42b of the two bearings 42 and 42'. The shaft 41 is supported by the two bearings 42 and 42'. Therefore, the shaft 41 is rotatably supported on the housing 5. A snap ring 44 is attached closer to the one end portion 41a side than the bearing 42 in the shaft 41 to restrain the shaft 41 from moving in the upward direction in FIG. 1 (dropping off of the shaft 41). A metal washer can be used instead of the snap ring 44 if necessary, thereby more strongly preventing the shaft 41 from dropping off.

On the other hand, the outer rings 42a and 42a' of the two bearings 42 and 42' are fitted and fixed to, and supported by, the two large inner diameter portions 43b of the sleeve 43, respectively. Accordingly, in the cartridge 4, the shaft 41 is rotatably supported with respect to the sleeve 43.

The housing 5 includes the bottom portion 51 formed in a shape of a substantially flat plate, an attaching portion 54, and a stator fixing portion 55. The cartridge 4 is to be removably attached to the attaching portion 54, and the stator 2 is to be fixed to the stator fixing portion 55. A surface for receiving an impact from outside is formed at the bottom portion 51. The bottom portion 51 extends in a direction intersecting with respect to the longitudinal direction (axial direction) of the shaft.

Figure 4:
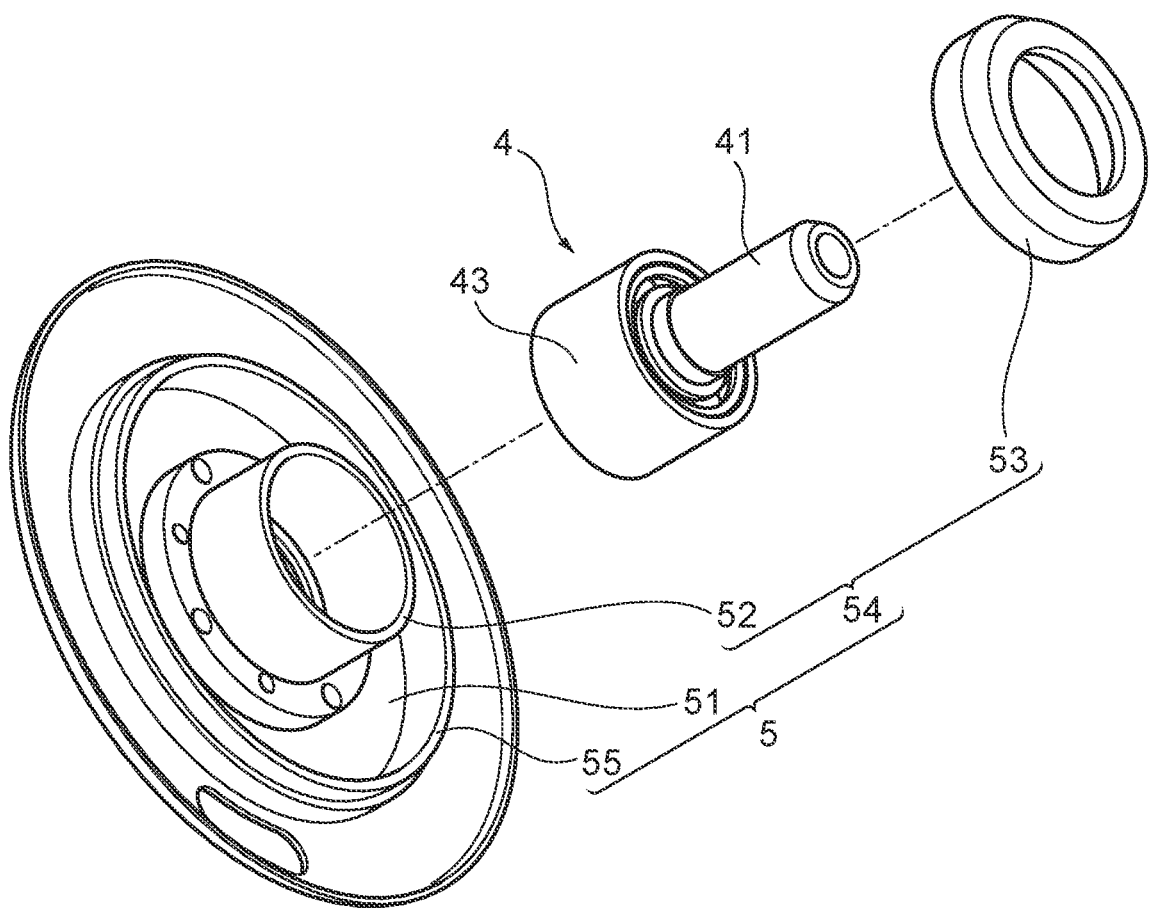
FIG. 4 is an exploded view for illustrating a state. In the state, the cartridge is attached to a housing.
Figure 5:
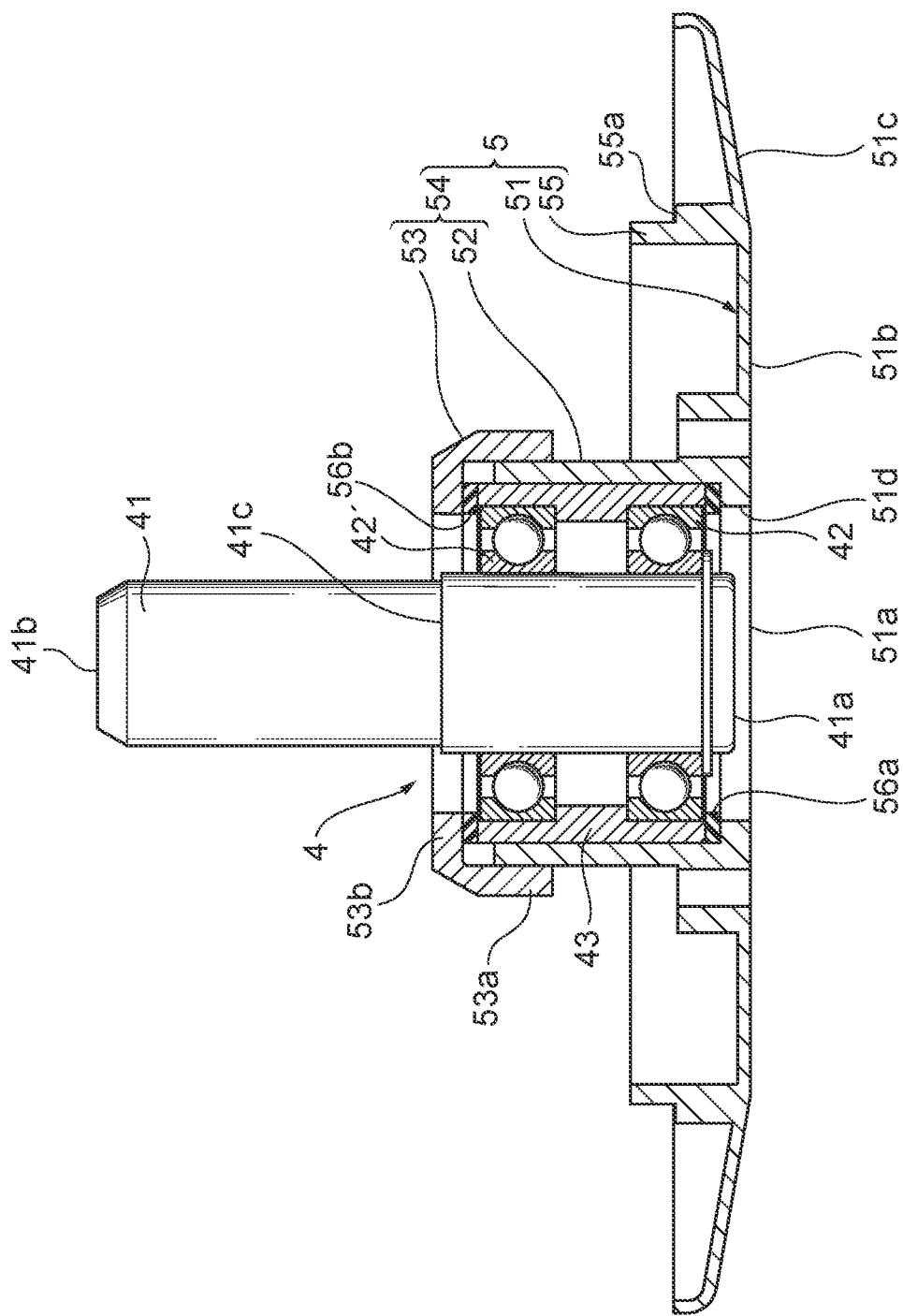
FIG. 5 is a cross-sectional view illustrating only the cartridge and the housing removed from FIG. 1.

FIG. 4 is an exploded view for illustrating a state In the state, the cartridge 4 is attached to the housing 5. FIG. 5 is a cross-sectional view illustrating only the cartridge 4 and the housing 5 removed from FIG. 1.

The bottom portion 51 has an opening 51a having a circular shape formed around a position (center of the bottom portion 51) intersecting with respect to the longitudinal direction of the shaft 41, a flat plate area (flat plate portion) 51b having an annular shape formed around the opening 51a, and an inclined area (inclined portion) 51c having an annular shape, the inclined area 51c extending outward from the outer edge of the flat plate area 51b while being inclined upward (on the stator 2 side). The shaft 41 is visible from below the motor 1 through the opening 51*a*.

A cylindrical portion 52 for accommodating a part of or the whole of the cartridge 4 is provided at the bottom portion 51. In an area inside (on a center side) of the cylindrical portion 52, not only the opening 51*a* but also an extended portion 51*d* is formed, the extended portion 51*d* formed in an annular shape and extending from an inner peripheral surface of the cylindrical portion 52 toward a center axis. An elastic member 56*a* formed in a ring shape is attached on an upper surface (inner surface of the housing 5) of the extended portion 51*d*.

The stator fixing portion 55 has a flat cylindrical shape extending from the bottom portion 51 to the stator 2 (upward in the axial direction of the shaft 41). A stepped portion 55*a* is formed on the outer periphery side of the stator fixing portion 55, the stepped portion 55*a* being formed at an intermediate portion of the stator fixing portion 55 to reduce the thickness of the outer diameter of stator fixing portion 55. The inner peripheral portion of the annular portion 24 is fitted to the stepped portion 55*a*, to fix the stator 2 to the housing 5 by a known means such as adhesion. The stator 2 surrounds the cartridge 4.

The attaching portion 54 includes the cylindrical portion 52 extending from the bottom portion 51 to the stator 2 (upward in the axial direction of the shaft 41), and a fixing member 53 formed separately from the cylindrical portion 52 and in a ring shape. The cylindrical portion 52 includes one end portion on the bottom portion 51 side and another end portion on the opposite side of the bottom portion 51. The fixing member 53 is provided on the other end portion of the cylindrical portion 52.

The fixing member 53 includes a cylindrical portion (hereinafter, referred to as a cylindrical portion) 53*a* and an annular portion (hereinafter, referred to as a holding piece portion) 53*b* extending from one end portion of the cylindrical portion 53*a* toward the center axis and formed in an annular shape. A spiral groove (not illustrated) is provided at the inner peripheral surface of the cylindrical portion 53*a*, to be engageable with thread spiral groove (not illustrated) provided on an upper part of the outer peripheral surface of the cylindrical portion 52.

An elastic member 56*b* formed in a ring shape is attached to a lower surface (surface facing the bottom portion 51) of the holding piece portion 53*b*. The lower surface of the holding piece portion 53*b* faces an upper end portion of the sleeve 43. The elastic member 56*a* and the elastic member 56*b* are formed with a member having elasticity, for example, a material having elasticity such as natural rubber, synthetic rubber, silicone rubber, or elastomer. The elastic member 56*a* and the elastic member 56*b* are made of the same material and are formed in the same shape in the present embodiment, but may be made of different materials and have shapes different in thickness and diameter.

The cartridge 4 (sleeve 43) is accommodated in the cylindrical portion 52 and attached to the housing 5. The fixing member 53 is screwed and fixed to the upper part (end portion on the opposite side of the bottom portion 51) of the cylindrical portion 52, to arrange and fix the cartridge 4 (sleeve 43) to the bottom portion 51. In other words, the cartridge 4 is fixed by being sandwiched between the fixing member 53 and the bottom portion 51. As described above, the cartridge 4 is removably attached to the attaching portion 54 together with the shaft 41.

At this time, in the longitudinal direction (axial direction) of the shaft 41, the elastic member 56*a* is interposed between the lower end portion of the sleeve 43 and the bottom portion 51 (extended portion 51*d*), and the elastic member 56*b* is interposed between the upper end portion of the sleeve 43 and the fixing member 53. These elastic members 56*a* and 56*b* can prevent an impact from outside from being transmitted to the cartridge 4.

When the cartridge 4 is attached to the housing 5, the one end portion 41*a* of the shaft 41 is positioned on a more inward side (upward side in FIG. 1) of the housing 5 than the bottom 51. In other words, the one end portion 41*a* of the shaft 41 is in a state of floating from the bottom 51. Therefore, for example, an impact from below can be prevented from being directly transmitted to the shaft 41.

Figure 6:
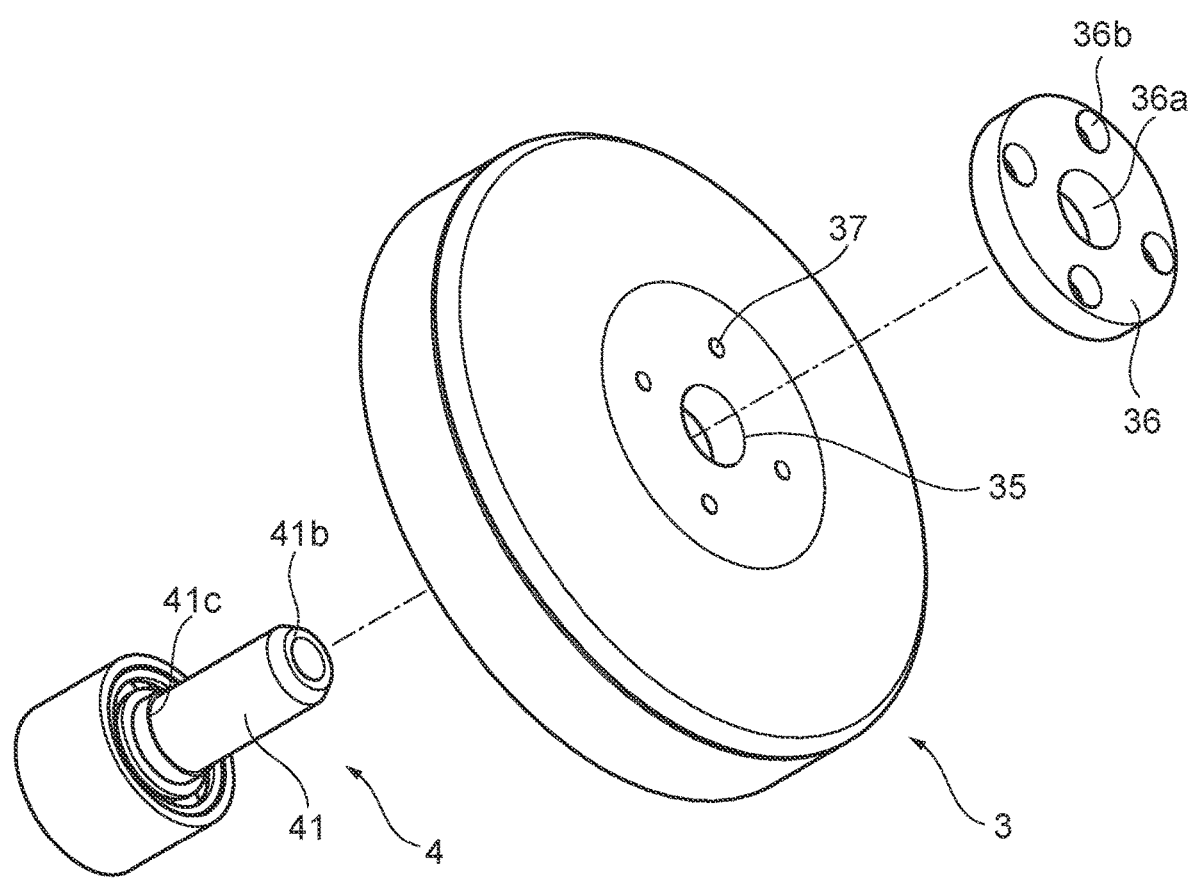
FIG. 6 is an exploded view for illustrating a state. In the state, a rotor is attached to a shaft.

The rotor 3 is removably fixed to the shaft 41 of the cartridge 4 attached to the housing 5 at a position between the other end portion 41*b* on the opposite side of the bottom portion 51 side and the bearing 42'. FIG. 6 is an exploded view for illustrating a state. In the state, the rotor 3 is attached to the shaft 41. In FIG. 6, the stator 2 and the housing 5 are omitted.

When the shaft 41 is inserted, from the other end portion 41*b* side, through a hole portion (hereinafter, referred to as an axial hole 35) provided at the center axis of the rotor 3, an inner peripheral portion of the axial hole 35 contacts the stepped portion 41*c* of the shaft 41. Next, the shaft 41 is inserted through an axial hole 36*a* of an attachment 36, and the rotor 3 is fixed to the shaft 41 by four screws threaded each into a threaded hole 37 in the rotor 3 and a threaded hole 36*b* in the attachment 36. The rotor 3 or the attachment 36 is fixed to the shaft 41 by a fixing means (not illustrated), to regulate movement of the shaft 41 in the rotational direction, and the shaft 41 rotates together with the rotation of the rotor 3.

The motor 1 having the structure illustrated in FIG. 1 and FIG. 2 of the present embodiment is completed by being assembled as described above.

According to the motor of the present embodiment, the cartridge 4 can be removed from the attaching portion 54 of the housing 5 only by removing the rotor 3 from the shaft 41 and removing the fixing member 53 from the upper end of the cylindrical portion 52. The cartridge 4 can be easily attached as described above. In other words, according to the motor of the present embodiment, the cartridge 4 can be easily attached and removed.

When the motor is used for a floating mobile body such as a drone, for example, the bearing, being a precision component, is readily broken if the floating mobile body is subjected to a large impact upon landing. If the bearing is broken, the whole motor should be replaced conventionally. However, according to the motor of the present embodiment, the cartridge 4 is removably attached to the attaching portion 54 in a state. In the state, the shaft 41 is supported on the cartridge 4. Therefore, only the cartridge 4 supporting the shaft 41 can be prepared as a replacement part, and replaced, and the broken bearing can be restored to restore the motor. Accordingly, the motor can be replaced easily at low cost by replacing only the cartridge 4, thereby significantly reducing the labor and cost.

When the whole motor is assembled, an individual difference of the motor in performance is easily caused by a large number of components and factors influencing the performance and the tolerance. Thus, if the whole motor is replaced, the driving adjustment of the motor is likely required to be reviewed, requiring labor and cost. However, since the cartridge 4 having homogeneous performance can be easily produced with a small number of components and with high precision, the individual difference in performance is not easily produced. Therefore, in the present embodiment only the cartridge 4 is replaced, the driving adjustment of the motor is not required to be reviewed before and after the replacement, and it can be expected to increase the lifetime of the motor, improve the performance of the motor owing to reduction in mechanical load, and to increase the added value in performance such as reduction in vibration and noise caused by the irregularity of rotation.

In the motor 1 of the present embodiment, about the impact load applied to the outer peripheral surface of the motor causing bearing damage, damage is less transmitted directly to the bearing 42 because the bearing 42 is assembled through the sleeve 43, the sleeve 43 being a separate component, as compared to the conventional structure. In the conventional structure, the bearing is attached directly to the outer peripheral member. Therefore, in the present embodiment, the strength against the external impact can be increased.

Furthermore, in the motor 1 of the present embodiment, the elastic members 56a and 56b are interposed in at least part of the space between the cartridge 4 and the housing 5. Since the cartridge 4 and the housing 5 are formed with different members, the bearing 42 can be protected by interposing the elastic members 56a and 56b as impact buffer materials between the cartridge 4 and the housing 5.

When the motor is used for the drone in particular, the motor is readily subjected to the impact load in the axial direction upon landing. However, in the present embodiment, the elastic member 56a is interposed between a part of the cartridge 4 (sleeve 43) and the bottom portion 51 and the elastic member 56b is interposed between a part of the cartridge 4 (sleeve 43) and the fixing member 53. In this state, the cartridge 4 faces the housing 5 as viewed in the axial direction of the shaft 41, namely, in the longitudinal direction (axial direction) of the shaft 41, thereby further improving the impact resistance against the impact load in the axial direction.

In the motor 1 of the present embodiment, the elastic members 56a and 56b are provided between the sleeve 43 and the bottom portion 51 and between the sleeve 43 and the fixing member 53, respectively, but the elastic members may be provided between the outer ring 42a instead of the sleeve 43 and the bottom portion 51 and between the outer ring 42a and the fixing member 53, respectively. Alternatively, the elastic members may be provided between the sleeve 43 and the outer ring 42a or the bottom portion 51 and between the sleeve 43 and the outer ring 42a or the fixing member 53, respectively. Furthermore, the elastic member may be provided to cover the whole cartridge 4. In other words, the impact resistance against the external impact can be expected to be improved, as long as the elastic member is interposed in at least part of the space between the cartridge 4 and the housing 5.

According to the motor of the present embodiment, since the one end portion 41a of the shaft 41 is positioned on a more inward side (upper side in FIG. 1) of the housing 5 than the bottom portion 51 and in a state of floating from the bottom portion 51. The impact from below is prevented from being transmitted directly to the shaft 41, thereby further improving the impact resistance against the impact load in the axial direction.

In the motor 1 of the present embodiment, the shaft 41 is visible from below the motor 1 through the opening formed in an area inside (on a center axis side) of the cylindrical portion 52 in the bottom portion 51. However, when the bottom portion is present at the position facing the one end portion 41a of the shaft 41 in a state. In the state, no opening is formed in the bottom portion or the opening is narrow, effects similar to the effects of the present embodiment can be provided, as far as the bottom portion and one end portion of the shaft are spaced from each other. The bottom portion and the one end portion of the shaft are thus spaced from each other is a state included in the concept of "one end portion on the bottom portion side is positioned on a more inward side of the housing than the bottom portion" in the present disclosure.

In the motor 1 of the present embodiment, the shaft 41 is made of, for example, aluminum, for the purpose of weight reduction, and the specific gravity of the shaft 41 is smaller than the specific gravity of the member (iron) forming the bearing 42. Accordingly, by reducing the weight of the shaft 41, the damage to the bearing 42 can be reduced when the motor is subjected to the external impact.

In the present embodiment, the shaft 41 is formed in a hollow shape (in particular, more preferably a cylindrical shape), thereby further reducing the damage to the bearing 42. Even when the shaft 41 is made of the same material as the bearing 42 or the material having the same specific gravity as the bearing 42, the weight of the shaft 41 can be reduced by forming the shaft 41 in a hollow shape, and the damage to the bearing 42 can be reduced when the motor is subjected to the external impact.

Figure 7:
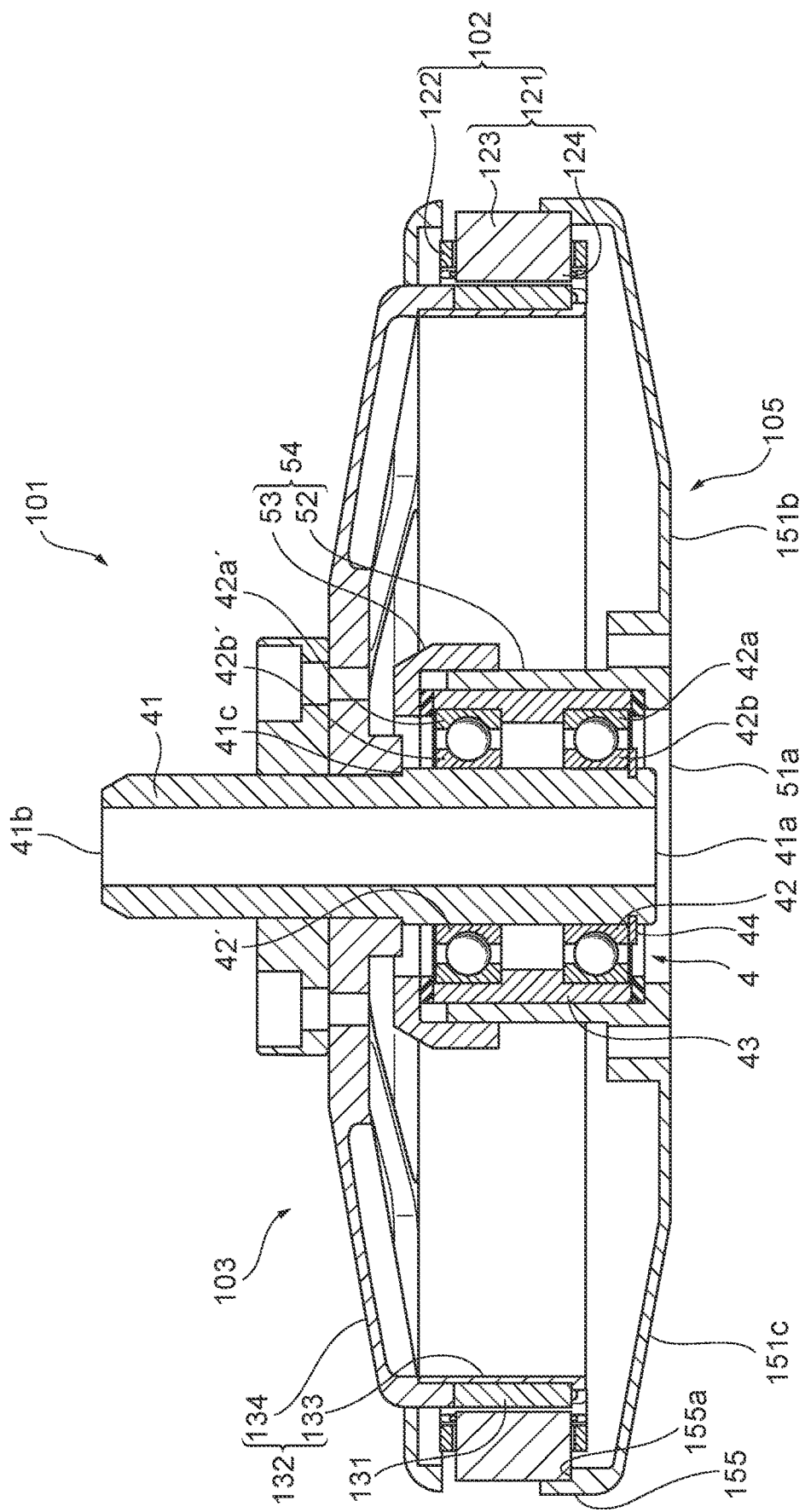
FIG. 7 is a cross-sectional view of a motor of an inner rotor type according to a variant of the present disclosure.

The motor of the present embodiment is formed as a brushless motor of an outer rotor type, but the present disclosure is also applicable to a motor other than a brushless motor. The present disclosure is also applicable to a motor of an inner rotor type. FIG. 7 is a cross-sectional view of a motor of a variant when a configuration of the present disclosure is applied to a motor of an inner rotor type. In FIG. 7, components having the same function, configuration and shape as components in the embodiment illustrated in FIG. 1 are denoted by the same reference numerals as the reference numerals in FIG. 1 (the embodiment), and the detailed description thereof will be omitted.

As illustrated in FIG. 7, in a motor 101 of an inner rotor type, a rotor 103 is disposed inside a stator 102. The rotor 103 includes a rotor yoke 132, and a magnet 131 formed in an annular shape, the magnet 131 being attached to an outer peripheral surface of the rotor yoke 132. Since the rotor yoke 132 is positioned inside the stator 102, a tubular portion 133 has an outer diameter smaller than an outer diameter of an annular portion 124 of the stator 102, and an outer diameter of a disc portion 134 is set according to the outer diameter of the tubular portion 133.

The stator 102 disposed to surround the rotor 3 includes a stator core 121 including an annular portion (core) 124 disposed coaxially with the shaft 41, and a plurality of tooth parts (magnetic pole parts) 123 formed to extend from the annular portion 124 toward the shaft 41 (center), and a coil 122 wound around each of the plurality of tooth parts 123.

In the housing 105, a structure around the attaching portion 54 is the same as the structure of the housing 5 of the embodiment, but the housing 105 is different from the housing 5. In the housing 105, a stator fixing portion 155 is positioned on the outer edge of the inclined area 151c, and a stepped portion 155a is formed on the inner periphery side of the stator fixing portion 155. The cartridge 4 is removably attached to the attaching portion 54 and the stator 102 is fixed to the stator fixing portion 155. A flat plate area 151b and the inclined area 151c are also different in size and shape, due to these differences in configuration.

As illustrated in FIG. 7 as a variant, the configuration of the present disclosure is applicable to the motor 101 of an inner rotor type, without any problem. According to this variant, the effect of easily attaching and removing the cartridge 4 can be provided, and various effects of the present disclosure accompanying the other effects described in the section of the embodiment are also provided.

While a preferred embodiment of the motor of the present disclosure has been described above, the motor of the present disclosure is not limited to the configuration of the above-described embodiment. For example, in the above-described embodiment, an example is described. In the example, the number of bearings is two of 42 and 42', but the number of bearings included in the cartridge can be three or more.

In the above-described embodiment, an example is described. In the example, one cartridge is formed in a state. In the state, the cartridge 4 includes the shaft 41 has been described, but in the present disclosure, the cartridge can include a plurality of bearings and a sleeve without including the shaft. If the bearing needs to be replaced due to breakage even when the cartridge does not include shaft, the bearing can be easily replaced along with the cartridge.

Since the shaft is formed separately from the cartridge, for example, only the cartridge including the broken bearing can be replaced, and the shaft in a usable condition can be used as it is. When not only the cartridge but also the shaft needs to be replaced, a shaft is also prepared for replacement purpose, in addition to the cartridge. The shaft is press fitted in the bearing in advance, and the entire cartridge supporting the shaft is replaced.

Even when the cartridge does not include the shaft, the bearing can be assembled to the sleeve with high precision. Therefore, the cartridge having homogeneous performance can be easily produced with high precision. Thus, when only the cartridge 4 is replaced, the driving adjustment of the motor is not required to be reviewed before and after the replacement, and it can be expected to increase the lifetime of the motor, improve the performance of the motor owing to reduction in mechanical load, and to increase the added value in performance such as reduction in vibration and noise caused by the irregularity of rotation.

Needless to say, in the configuration exemplified in the above-described embodiment one cartridge being formed in a state including the shaft, the entire cartridge supporting the shaft can be easily replaced, thus being preferable in view of the working efficiency.

In the above-described embodiment, an example has been described. In the example, the elastic members 56a and 56b are attached (stuck) to the components (extended portion 51d in the bottom portion 51 and the holding piece portion 53b in the fixing member 53) on the housing 5 side. However, the elastic member is not necessarily attached to the component on the housing 5 side. The elastic member may be attached to the component (for example, the sleeve 43 or the like) on the cartridge 4 side. Alternatively, the elastic member may be simply interposed between the housing 5 and cartridge 4 as a separate part without being attached to both of the housing 5 and the cartridge 4.

To provide the effect of the present disclosure based on the removable cartridge, the elastic member does not need to be interposed between the cartridge and the housing. However, needless to say, it is preferable to interpose the elastic member between the cartridge and the housing.

As the housing 5, an example of a configuration has been described above. In the configuration, the bottom portion 51 includes the area of the flat plate (flat plate area 51b). However, the entire bottom portion of the housing may be formed in a flat plate shape. Alternatively, the bottom portion of the housing may be formed by, for example, a gentle dome shape or only the inclined surface, without including the area of the flat plate. If the housing has a surface able to form the bottom portion as a whole regardless of the presence or absence of the area of the flat plate, the surface is included in the concept of "a bottom portion formed in a shape of a flat plate or a substantially flat plate."

In the present embodiment, an example has been described. In the example, the sleeve 43 includes the small inner diameter portion 43a and the large inner diameter portions 43b and is formed in a shape having a uniform outer diameter has been described above. However, in the present disclosure, the shape of the sleeve is not limited. A sleeve capable of supporting the outer rings of the plurality of bearings and being removably attached to the attaching portion of the housing can be used with no problem.

In addition, those skilled in the art can appropriately vary the motor of the present disclosure according to the conventional knowledge. The concerned variation, as far as still including the configuration of the present disclosure, should of course be included in the scope of the present disclosure.

What is claimed is:

1. A motor comprising:
a shaft including one end portion and another end portion;
two ball bearings supporting a first part of the shaft in the one end portion side of the shaft, and
a rotor fixed at a second part of the shaft between the another end portion of the shaft and the ball bearings; and
a stator surrounded by the rotor; and
a housing including a bottom portion and a cylindrical portion provided at the bottom portion and a stator fixing portion provided at the bottom portion, wherein
the cylindrical portion accommodates the two ball bearings, and
the rotor being rotatably supported at the housing, and
the bottom portion of the housing is arranged between the cylindrical portion and the stator fixing portion in a radial direction, the bottom portion extending in a direction intersecting with respect to a longitudinal direction of the shaft, and
the stator is fixed at the stator fixing portion.

2. The motor according to claim 1, comprising a snap ring attached to a shaft, wherein
the snap ring is arranged between one end portion of the shaft and the bearing in the one end portion side of the shaft.

3. The motor according to claim 1, wherein
the shaft is formed in a hollow shape.

4. The motor according to claim 1, wherein
one end portion of the shaft is positioned inward relative to the bottom portion of the housing.

5. The motor according to claim 1, wherein
the rotor is removably fixed to the shaft.

* * * * *